United States Patent
Baggott

(10) Patent No.: US 8,635,146 B2
(45) Date of Patent: Jan. 21, 2014

(54) SPORTS SHARE TRADING SYSTEM AND METHOD

(76) Inventor: Justin D. Baggott, Desoto, IL (US)

( * ) Notice: Subject to any disclaimer, the term of this patent is extended or adjusted under 35 U.S.C. 154(b) by 98 days.

(21) Appl. No.: 13/297,102

(22) Filed: Nov. 15, 2011

(65) Prior Publication Data

US 2012/0123928 A1   May 17, 2012

Related U.S. Application Data

(60) Provisional application No. 61/414,672, filed on Nov. 17, 2010.

(51) Int. Cl.
*G06Q 10/00* (2012.01)

(52) U.S. Cl.
USPC ............................................. 705/37; 705/1.1

(58) Field of Classification Search
USPC .......................................................... 705/1.1
See application file for complete search history.

(56) References Cited

U.S. PATENT DOCUMENTS

| | | | |
|---|---|---|---|
| 7,702,540 B1 | 4/2010 | Woolston | |
| 7,742,978 B2 | 6/2010 | Boesel | |
| 7,797,194 B1 | 9/2010 | Friss et al. | |
| 2003/0107173 A1* | 6/2003 | Satloff et al. | 273/292 |
| 2005/0182693 A1* | 8/2005 | Alivandi | 705/27 |
| 2006/0015435 A1 | 1/2006 | Nathanson | |
| 2006/0247056 A1* | 11/2006 | Luckerson | 463/42 |
| 2006/0259389 A1* | 11/2006 | Richter | 705/35 |
| 2007/0011172 A1 | 1/2007 | Ruul | |
| 2007/0021165 A1 | 1/2007 | Ma et al. | |
| 2007/0021214 A1 | 1/2007 | Ma et al. | |
| 2007/0021853 A1 | 1/2007 | Ma et al. | |
| 2007/0198365 A1 | 8/2007 | Dutta et al. | |
| 2007/0244770 A1 | 10/2007 | Boesel | |

OTHER PUBLICATIONS thepit.com Mar. 16, 2009.*
thepitcom_IanKennedy May 25, 2009.*
thepit.com_AccountProtection Mar. 16, 2009.*
thepit_howtobuyandsell Mar. 16, 2009.*
http://www.fantasysportsstocks.com/.
https://www.starstreet.com/.
http://www.thepit.com/index/index.asp.

* cited by examiner

*Primary Examiner* — William Rankins
(74) *Attorney, Agent, or Firm* — Richard C. Litman

(57) ABSTRACT

The sports share trading system provides a web site in which users, using real money, trade equitable shares of athletes in a closed market. Rookie sports cards are tokens representing the shares of stock in the athletes and are traded as financial instruments via the web site. Users who buy cards, i.e., shares of stock, and keep them in the market are eligible for bonuses and guaranteed buy-backs if they choose. A Hall-of-Fame guaranteed buy back rewards users owning shares representing athletes who reach predetermined performance levels designated as "Hall of Fame Tiers". The buy-back offers are at a predetermined, published, guaranteed price, representing a conditionally guaranteed future value of all purchases. The self-contained trading platform web site is accessible by a variety of web-enabled devices.

19 Claims, 26 Drawing Sheets

Fig. 5

Jockbrokers
Your caption goes here

Market | My Watchlist | Portfolio | Athlete Research | New Releases | Calendar | Auctions Preferences | Performance Bonus My Account | Logout

My Account

| | | |
|---|---|---|
| Name | : | First Last |
| Email | : | name@adomain.com |
| User Name | : | Some Name |
| Phone | : | ############ |
| Account No. | : | ############### |
| Balance | : | $ 50.00 |
| Credit Card No | : | ****************** |
| Bank Name | : | A Bank |

[Edit]  [Deposit Fund]

← 802

Pending Buy Orders  ← 804

| Name | Quantity | Symbol | Offer Price | Last Price | Expiration |
|---|---|---|---|---|---|
| Famous 1 | 34 | | $ 5.50 | $ 10.80 | 03-24-11 12:30 PM |
| Famous 2 | 56 | | $ 5.00 | $ 16.00 | 04-10-11 11:33 AM |
| Famous 5 | 32 | | $ 3.00 | $ 14.60 | 05-19-11 08:15 PM |
| Famous 4 | 5 | | $ 9.00 | $ 8.40 | 06-02-11 01:21 AM |

Pending Sell Orders — 806

| Name | Quantity | Symbol | Offer Price | Last Price | Expiration | |
|---|---|---|---|---|---|---|
| Famous 1 | 34 | | $ 5.00 | $ 10.80 | 03-24-11 | 12:30 PM |
| Famous 2 | 56 | | $ 6.00 | $ 16.00 | 04-10-11 | 11:30 AM |
| Famous 5 | 32 | | $ 8.00 | $ 14.60 | 05-19-11 | 08:15 PM |
| Famous 4 | 5 | | $ 9.00 | $ 8.40 | 06-08-11 | 01:21 AM |

Recent Transactions — 808

| Name | Quantity | Symbol | Average Price | Buy/Sell | Date | Time |
|---|---|---|---|---|---|---|
| Famous 1 | 20 | | $ 5.00 | Buy | 12-12-10 | 12:30 PM |
| Famous 2 | 6 | | $ 6.00 | Sell | 10-20-10 | 11:30 AM |
| Famous 5 | 58 | | $ 8.09 | Buy | 09-19-10 | 08:15 PM |
| Famous 6 | 100 | | $ 3.00 | Buy | 05-08-10 | 01:21 AM |
| Famous 4 | 35 | | $ 6.40 | Sell | 04-16-10 | 10:20 AM |

About Us | Tutorial | FAQ | Contact Us | Terms and Conditions

*Fig. 8B*

Jockbrokers

Your caption goes here

Market | My Watchlist | Portfolio | Athlete Research | New Releases | Calendar | Auctions Preferences | Performance Bonus My Account | Logout

My Account

| | |
|---|---|
| Name | : First Last |
| Email | : name@adomain.com |
| User Name | : Some Name |
| Phone | : ############ |
| Account No. | : ################ |
| Balance | : $ 50.00 |
| Credit Card No | : ******************** |
| Bank Name | : A Bank |

Edit   Deposit Fund   ← 802

Amount  $ [        ]  Pay Now   ← 910

Pending Buy Orders   ← 804

| Name | Quantity | Symbol | Offer Price | Last Price | Expiration |
|---|---|---|---|---|---|
| Famous 1 | 34 | | $ 5.00 | $ 10.80 | 03-24-11  12:30 PM |
| Famous 2 | 56 | | $ 6.00 | $ 16.00 | 04-10-11  11:30 AM |
| Famous 5 | 32 | | $ 8.00 | $ 14.60 | 05-19-11  08:15 PM |
| Famous 4 | 5 | | $ 9.00 | $ 8.40 | 06-03-11  01:21 AM |

Pending Sell Orders — 806

| Name | Quantity | Symbol | Offer Price | Last Price | Expiration | |
|---|---|---|---|---|---|---|
| Famous 1 | 34 | | $ 5.00 | $ 10.80 | 03-24-11 | 12:30 PM |
| Famous 2 | 56 | | $ 6.00 | $ 16.00 | 04-10-11 | 11:30 AM |
| Famous 5 | 32 | | $ 8.00 | $ 14.60 | 05-19-11 | 08:15 PM |
| Famous 4 | 5 | | $ 9.00 | $ 9.40 | 06-08-11 | 01:21 AM |

Recent Transactions — 808

| Name | Quantity | Symbol | Average Price | Buy/Sell | Date | Time |
|---|---|---|---|---|---|---|
| Famous 1 | 20 | | $ 5.00 | Buy | 12-12-10 | 12:30 PM |
| Famous 2 | 5 | | $ 6.00 | Sell | 10-20-10 | 11:30 AM |
| Famous 5 | 58 | | $ 8.00 | Buy | 09-19-10 | 08:15 PM |
| Famous 6 | 100 | | $ 2.00 | Buy | 05-08-10 | 01:21 AM |
| Famous 4 | 35 | | $ 6.40 | Sell | 04-16-10 | 10:20 AM |

About Us | Tutorial | FAQ | Contact Us | Terms and Conditions

*Fig. 9B*

Most Recent Sell 1006

| Name | Quantity | Price | +/- |
|---|---|---|---|
| Famous 1 | 5 | $ 16.00 | $ 5.00 |
| Famous 2 | 8 | $ 25.00 | $ 12.00 |
| Famous 3 | 3 | $ 16.00 | $ 3.00 |
| Famous 4 | 7 | $ 25.00 | $ 4.50 |
| Famous 5 | 8 | $ 35.00 | $ 6.80 |

About Us | Tutorial | FAQ | Contact Us | Terms and Conditions

*Fig. 10B*

Hall-of-Fame buy backs

This is not a bonus but a guarantee to purchase your shares back from you at the time of the athlete's retirement at a specific price. You may choose to hold them or sell them in the market but you will always have the option to sell them back to Jockbrokers at this price that corresponds with the performance level the athlete achieved.

MLB - Hall of Fame Achievement Levels

Level 1 = $100

| | HR | RBI | SB | R | H | K | W | S | ERA (minimum 1000 IP) | WHIP (minimum 1000 IP) |
|---|---|---|---|---|---|---|---|---|---|---|
| Any one of these | 700 | 2500 | 1000 | 2500 | 4000 | 4000 | 400 | 500 | <3.00 | <1.00 |
| Any two of these | 650 | 2300 | 800 | 2300 | 3500 | 3500 | 350 | 450 | <3.05 | <1.05 |
| Any three of these | 600 | 2100 | 600 | 2100 | 3200 | 3200 | 300 | 400 | <3.10 | <1.10 |

Level 2 = $50

| | HR | RBI | SB | R | H | K | W | S | ERA (minimum 1000 IP) | WHIP (minimum 1000 IP) |
|---|---|---|---|---|---|---|---|---|---|---|
| Any one of these | 650 | 2300 | 800 | 2200 | 3500 | 3500 | 350 | 450 | <3.10 | <1.05 |
| Any two of these | 600 | 2100 | 600 | 2100 | 3200 | 3000 | 300 | 400 | <3.20 | <1.10 |
| Any three of these | 550 | 1900 | 500 | 1900 | 3000 | 2700 | 280 | 350 | <3.25 | <1.15 |

Level 3 = $30

| | HR | RBI | SB | R | H | K | W | S | ERA (minimum 1000 IP) | WHIP (minimum 1000 IP) |
|---|---|---|---|---|---|---|---|---|---|---|
| Any one of these | 600 | 2100 | 600 | 2100 | 3200 | 3000 | 300 | 400 | <3.20 | <1.10 |
| Any two of these | 550 | 1800 | 500 | 1900 | 3000 | 2700 | 290 | 380 | <3.25 | <1.15 |
| Any three of these | 500 | 1600 | 450 | 1800 | 2800 | 2600 | 270 | 350 | <3.30 | <1.18 |

1722 → Hall-of-Fame buy backs
1724 → MLB - Hall of Fame Achievement Levels
1726 → Level 2
1728 → Level 3

*Fig. 17D* jockbrokers

Your caption goes here

Market | My Watchlist | Portfolio | Athlete Research | New Releases | Calendar | Auctions Preferences | Performance Bonus My Account | Logout

Recent Transaction *1902*

Sport | Buy / sell *1904* | Auction *1906* | 30 Days *1908* | Submit *1910*

| Name | Quantity | Individual | Total Value | Date | Time |
|---|---|---|---|---|---|
| Famous 1 | 20 | $5.00 | $10.50 | 01-24-11 | 12:30 AM |
| Famous 2 | 6 | $6.00 | $6.00 | 01-10-11 | 04:30 PM |
| Famous 3 | 58 | $8.50 | $14.60 | 12-19-10 | 10:30 AM |
| Famous 4 | 100 | $3.50 | $3.80 | 11-08-10 | 08:30 AM |
| Famous 7 | 35 | $6.40 | $8.90 | 11-01-10 | 06:30 PM |

*1912*

About Us | Tutorial | FAQ | Contact Us | Terms and Conditions

SPORTS SHARE TRADING SYSTEM AND METHOD

CROSS-REFERENCE TO RELATED APPLICATION

This application claims the benefit of U.S. Provisional Patent Application Ser. No. 61/414,672, filed Nov. 17, 2010.

BACKGROUND OF THE INVENTION

1. Field of the Invention

The present invention relates to sports share trading web sites, and particularly to an Internet-based sports share trading system and method that allow users to trade virtual shares in the careers of professional athletes.

2. Description of the Related Art

Familiar types of trading cards include the well-known baseball and other sports cards. Sports cards are often provided with a photographic depiction of an athlete, along with biographic and statistical information concerning various athletes and teams. Other cards dealing with sports figures are also available and are used by sports enthusiasts for collecting information about athletes and sports teams. Cards are often traded on the open market. However, under open market conditions it is difficult to peg the intrinsic value of the card to the underlying athlete performance in the game.

Thus, a sports share trading system and method solving the aforementioned problems is desired.

SUMMARY OF THE INVENTION

The sports share trading system is a closed trading market operable within a web site that introduces an athlete's rookie sports card as a financial instrument for trading virtual shares in the performance of athletes. The closed market concept creates scarcity, and the cards used in the market have conditionally guaranteed value if the athlete they represent meets certain criteria on the playing field. In case the athlete reaches the performance levels that are stated as "Hall of Fame Tiers", the company will offer buy-backs upon the retirement of the athlete at a predetermined, published, guaranteed price, therein a conditionally guaranteed future value of all purchases.

These and other features of the present invention will become readily apparent upon further review of the following specification and drawings.

BRIEF DESCRIPTION OF THE DRAWINGS

FIG. 5 is a screenshot of a new release list page of a sports share trading web site according to the present invention.

FIGS. 8A and 8B are screenshots of a user account page of a sports share trading web site according to the present invention.

FIGS. 9A and 9B are screenshots of a user account deposit page of a sports share trading web site according to the present invention.

FIGS. 10A and 10B are screenshots of a market page of a sports share trading web site according to the present invention.

FIGS. 17A, 17B, 17C, 17D, and 17E are screenshots of a performance bonus page of a sports share trading web site according to the present invention.

FIG. 19 is a screenshot of a transaction history page of a sports share trading web site according to the present invention.

Similar reference characters denote corresponding features consistently throughout the attached drawings.

DETAILED DESCRIPTION OF THE PREFERRED EMBODIMENTS

The sports share trading system and method provides a web site and on-line interface enabling users using real money to trade virtual shares of the careers of athletes in a closed market. Rookie sports cards are tokens representing the shares of stock in the athletes and are traded as financial instruments via the website. Users who buy cards, i.e., shares of stock, and keep them in the market are eligible for bonuses and guaranteed buy-backs if they choose. A hall-of-fame guaranteed buy-back rewards users owning shares representing athletes who reach predetermined performance levels designated as "Hall of Fame Tiers". The buy-back offers are at a predetermined, published, guaranteed price, representing a conditionally guaranteed future value of all purchases. The self-contained trading platform web site is accessible by a variety of web-enabled devices.

Figure 3:
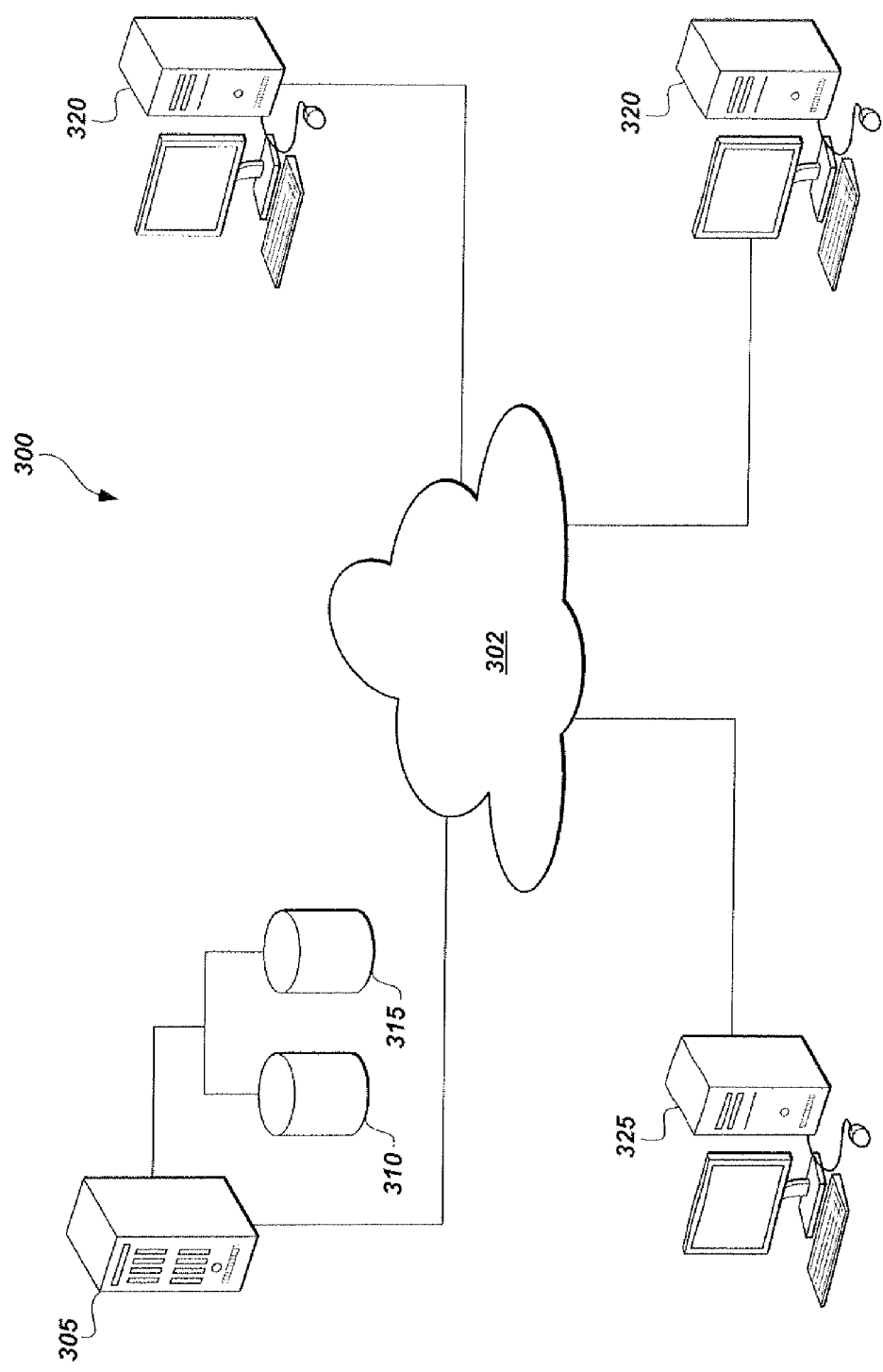
FIG. 3 is a block diagram of an exemplary network implementation of a sports share trading web site according to the present invention.

As show in FIG. 3, the system is implemented in a network 300 that permits web-enabled user devices 320 to connect via the Internet 302 to a web/application server 305 having mass storage devices 310 and 315 for storage of web, application and the storage of user membership data and accounting records in one or more databases. An administrator's terminal 325 may also connect to the server 305 via the Internet 302 for maintenance of the site.

The web pages discussed herein are served to a web-enabled user device via a web server portion of web/application server 305. The business logic/rules discussed herein are implemented via software applications that reside in and are executed by a web/application server 305.

Figure 1:
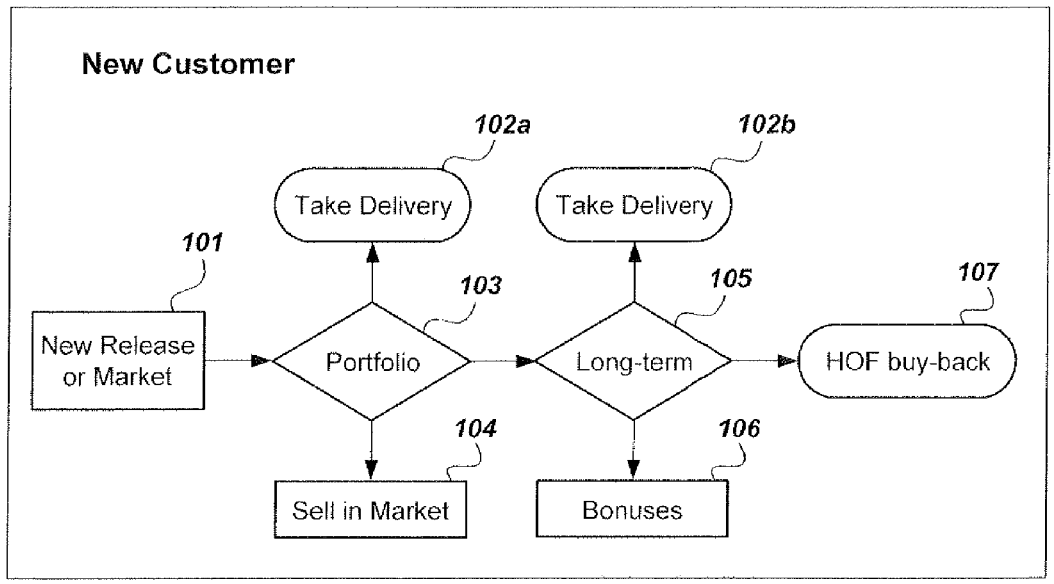
FIG. 1 is a block diagram of new user procedure implemented in a sports share trading system and method according to the present invention.

Within the network 300, users can trade electronic shares associated with a variety of professional athletes across a variety of sports. The software limits all cards in the market to rookie cards of the athlete, but it is contemplated that the card may be of any particular brand of card, based upon availability. The method does not permit a second issue or a change in the number or brand of a card that is used to represent an athlete in the market, nor does the system permit additional cards representing any particular athlete sold in the market. Therefore, only the specific card is used to represent the athlete in the market and only the maximum number available at the athlete's release will ever be available in the market for any particular athlete. As shown in FIG. 1, a new user can purchase cards as a new release or directly from other users in the market 101 to start their portfolio. Once in their portfolio 103, the user can take delivery 102*a* or sell in the market 104. Users' long term options 105 include taking delivery 102*b*, receiving bonuses 106 or relinquishing individual cards of retired athletes to the system admin under the Hall of Fame (HOF) buy back program 107

Figure 2:
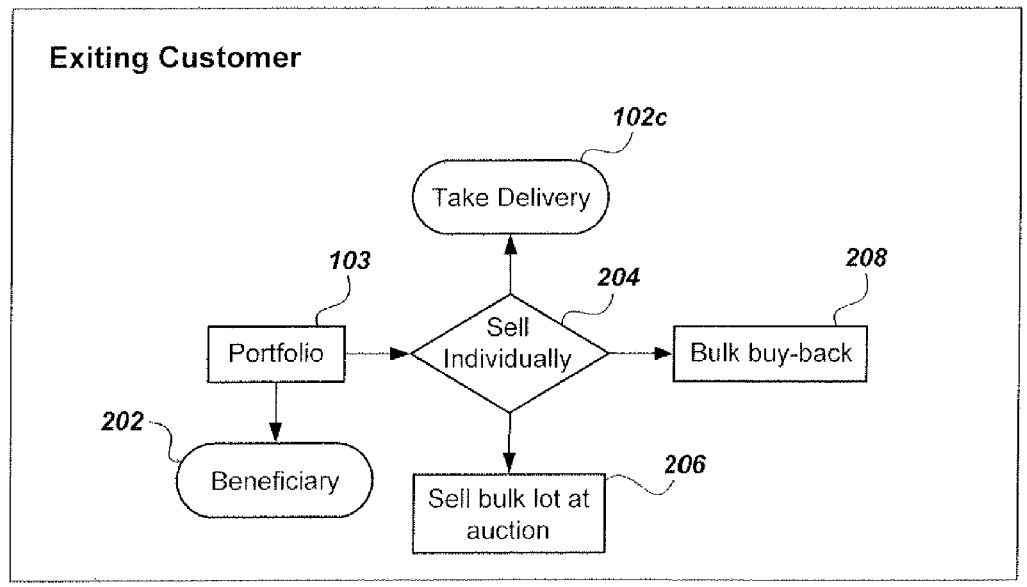
FIG. 2 is a block diagram of exiting user procedure implemented in a sports share trading system and method according to the present invention.

As shown in FIG. 2, a user with a portfolio 103 may transfer the portfolio 103 to a beneficiary 202. Alternatively, the user may, according to step 204, sell individually from the portfolio, in which case cards are transferred to the portfolio of the buyer 102*c*. The user may sell a bulk lot of trading cards at an online auction 206 set up by the system 300. Or, the user may participate in a bulk buy-back, as shown at block 208.

Figure 4:
FIG. 4 is a screenshot showing an exemplary tabular diagram on a portfolio page of a sports share trading web site according to the present invention.

As shown in FIG. 4, a user who comes into possession of a portfolio can view details of the portfolio via a portfolio page 400 offered by the web site of system 300. The portfolio page 400 shows a list of all of the cards held and the quantity in a user's account. The fields are arranged in columns, starting with the athlete's name 402, the quantity 404, the average purchase price 406, the total dollar amount invested (per athlete) 408, the total value (per athlete) 410, gain/loss 412, gain/loss percent 414, and last sale 416. The athlete names may be hyperlinks that link to the corresponding athlete page, where the user can buy additional cards or sell from his/her portfolio. Above the list of cards, the page will display the user's account balance and total current value held, based on the last sale of the cards held in his/her account. A button to place a user's entire portfolio up for auction is disposed beneath the list of cards held and next to a transaction history button. After clicking the "place for auction" button, the user is given a warning that the account will be frozen until the auction is complete and a suggestion to read the F.A.Q. or tutorials regarding this action before continuing. The user must enter his/her password to submit his/her portfolio to a market specialist for review. The system presents the portfolio to the market specialist for review. A guarantee offer is subsequently made by the company for the entire portfolio.

This price establishes the starting bid and the absolute minimum that the portfolio would sell for if the user decides to continue with the portfolio auction process. The system routes the offer to the user's registered email account, after which the user has three days to accept before the offer expires. The offer is contingent on no drastic changes to the potential performance of the athletes in the portfolio during the time from the submission to the auction closing date. If the user rejects the offer his/her account is unfrozen and it will perform as usual. If the user decides to continue with the auction process, the system prompts the user for a date and time entry designating when the auction is to close. At the bottom of the portfolio page details explain card delivery method and basic costs for shipping and handling.

A navigation bar persists as a user navigates among pages of the web site (as shown in FIG. 3). The navigation bar provides options to move between different functional areas of the web site. A scrolling ticker on all pages is customizable in the user's preferences page.

Figure 5:
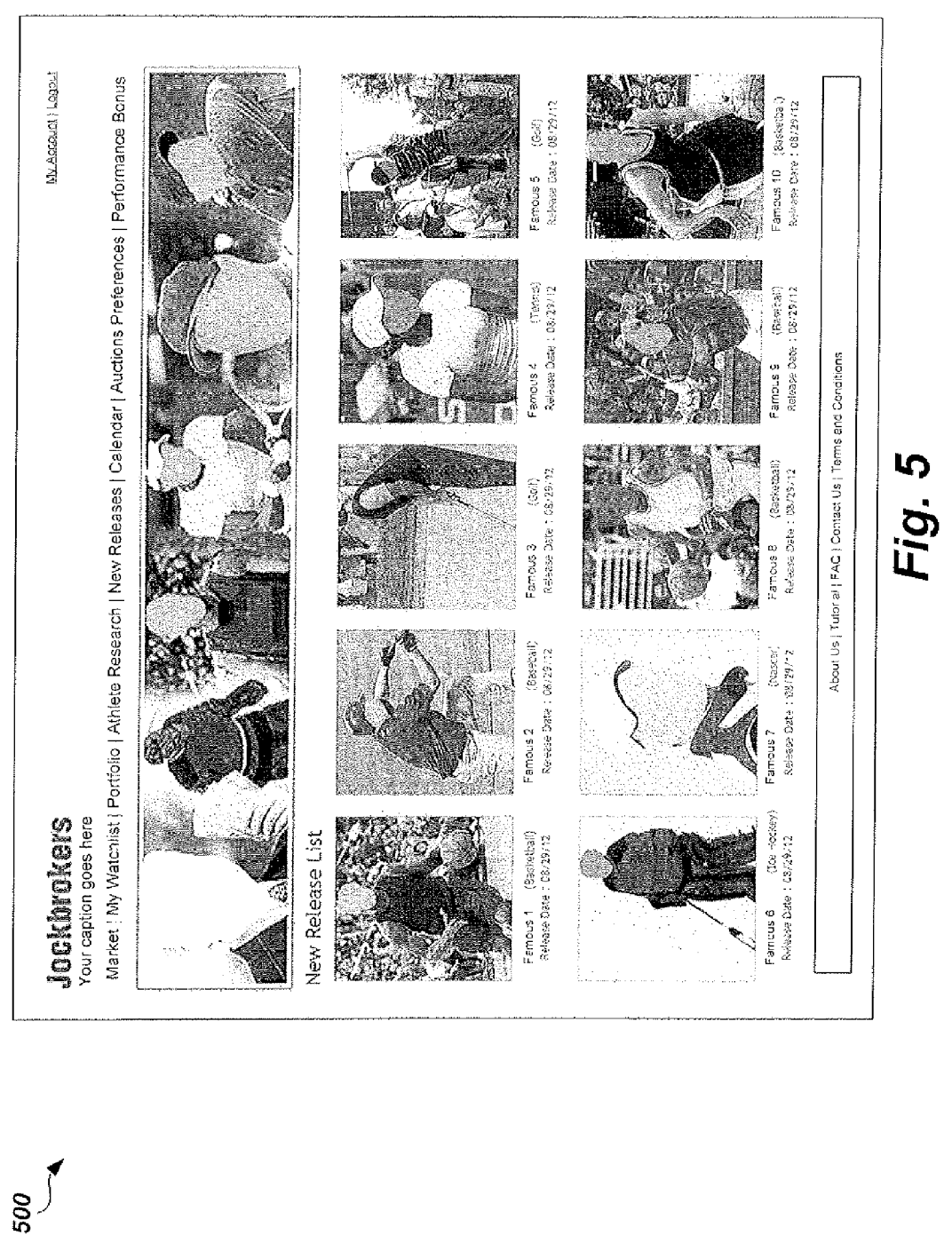

As shown in FIG. 5, a new release web page 500 is provided and displays a list of dates for upcoming releases. It may have a header that states in bold font "New Release List". This page provides a brief description about the new athlete cards that are going to be released into the market in the future. Release date, time and other details related to the New Release are displayed on the new release web page 500. Athlete indicia (e.g. photographic representation, sports card image, scanned image, and the like) are links which when clicked on take the user to the athlete page which has additional information which may include athlete name, card number, year of issue, brand of card, release date, athlete D.O.B., and quantity to be released into the market. The only difference between the athlete page of a new release and that of an athlete card being traded in the market is that the SELL button is either deleted or non-functional, e.g., grayed out. The user would see the same information as any other Athlete page but would only have the option to place the quantity and the price. This would not be posted anywhere publicly; it would only go to the administrator, who would see the ranked list with quantities, bid, username, and a timestamp. The user would get a receipt in his mailbox verifying that his bid was posted. Admin can set an end date and time for the bid. The user who bids the highest amount wins and he owns the cards (Number of cards which he bids for). If any other user bids at the closing time, the system 300 can give the time for other users to bid by extending the closing time of the bid. The New Release process is a blind bid auction where all cards to be released are sold to the highest bidder with top priority going to the bidder with the highest bid until the sum of all quantities requested by users equals that of the total listed in the release. This supply is capped, but may reduce over time as some users decide to take possession of their cards. In case of identical bid amounts, preference will be given to the user who placed their bid first.

Figure 6:
FIG. 6 is a screenshot of a home page of a sports share trading web site according to the present invention.

As shown in FIG. 6, a home web page 600 is provided from which a user may view general information about web site related events, or login via a link to a login page. On the main web page 600, a preview of new releases is displayed; most recent trades 602 are displayed as well as the current week's top gainers 604. Visitors are the general users of the site who can visit the site view the home page, tutorial, FAQ, and contact.

Figure 7:
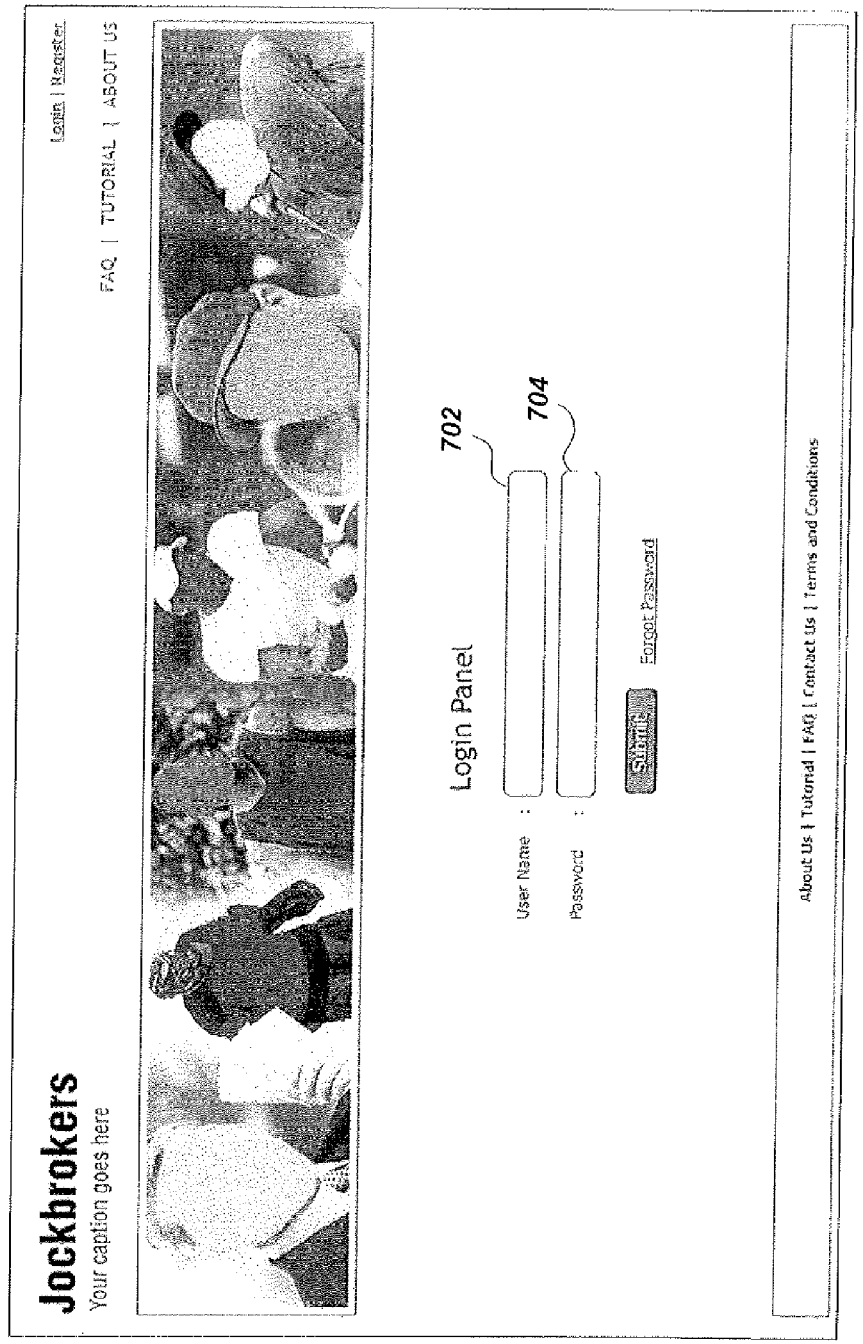
FIG. 7 is a screenshot of a login page of a sports share trading web site according to the present invention.

As shown in FIG. 7, a login page 700 is provided and includes a login panel 702 that provides entry fields for user name and password. Submit button and forgotten password link are provided in screen area 704. Login option always displays on the top of the site (header) along with the option for new members to register. Forgot password also includes in the header for retrieving the password.

As shown in FIGS. 8A-8B, an account page 800 provides entry to the portal of the web site where the user can deposit funds or view his/her account details such as name, mailing address, phone number, account number, balance, beneficiary, as well as credit card and banking information. From the account page the user can navigate to any other location on the site, which includes tutorials, frequently asked questions, contact us, athlete research, portfolio, calendar, auctions, new releases, performance bonuses, and preferences. The My account screen area 802 displays the user's full name, email, username, phone number, account number, balance, credit card number, and bank name. An edit button is also provided for account information changes that the user may wish to make. Also deposits for the site through PayPal® are contemplated by the method.

Pending buy orders displayed in screen area 804 includes columnar fields comprised of athlete name, quantity, symbol, offer price, list price, and offer expiration date and time.

Pending sell orders displayed in screen area 806 includes columnar fields comprised of athlete name, quantity, symbol, offer price, list price, and offer expiration date and time.

Recent transactions displayed in screen area 808 include columnar fields comprised of athlete name, symbol, quantity, average price, buy/sell indicator, and date and time.

As shown in FIGS. 9A-9B, the "my account" deposit page 900 includes the aforementioned screen areas 802, 804, 806, and 808. However, at a top central portion of the web page 900 is a deposit acceptance screen area 910 comprised of an amount entry field disposed above a "Pay Now" button to accept money from the user for credit to the user's account. Registered users in the site can login and need to deposit some amount for trading in the site. All registered users view all the pages that a trader can view but may not perform any trades until a deposit is made. Regarding registered user trading activity, all trades done in the market are transfers of electronic representations of a pristine rookie sports card of an athlete and electronic funds. While the underlying assets are real and attached to each electronic representation, the physical transactions of the sports cards are not actually taking place until the current owner requests to take delivery of the cards. The electronic funds are transferred at the same time as the electronic representation, but the actual funds are held in bulk by the system admin for disbursement to users upon request.

Figure 10A:

As shown in FIGS. 10A-10B, a market page 1000 has the look and functionality similar to a stock trading site market page. Exemplary default market page 1000 displays a generic watch list 1002. Watch list 1002 has columnar fields comprised of athlete name, last trade, +/−, lowest buy, and highest sell. Below the watch list 1002 is a most recent buy screen area 1004, which displays the last 10-50 trades, depending upon the user's preference settings. The lowest sell price (ask) and the highest buy price (bid) for each athlete token, e.g., sports card, will be shown on top with the quantity shown to the left of the price. If the user wishes to place an order, the user would click the athlete name to open the athlete page mini-window. Most recent sell screen area 1006 is displayed and has columnar fields comprised of athlete name, quantity, price, and +/− fields.

Figure 11:
FIG. 11 is a screenshot of a user's watch list page of a sports share trading web site according to the present invention.

As shown in FIG. 11, a user-specified watch list page 1100 is provided and includes a My Watch List screen area 1102 comprised of athletic trading cards to watch specified by the user. Below the My Watch List screen area 1102 is an order pad screen area 1104 comprised of the athlete name, symbol, quantity, price and buy, sell, or clear buttons to purchase a portfolio, sell a portfolio, or clear an order.

Figure 12:
FIG. 12 is a screenshot of a portfolio page of a sports share trading web site according to the present invention.

As shown in FIG. 12, a user's portfolio page 1200 is provided and includes a "My Portfolio" screen area 1202. Columnar fields are comprised of athlete name, quantity, average purchase price, total invested, total value, gain/loss, gain/loss %, and last sale fields. Below these fields a transaction history button 1204 is provided and links to a history of transactions that the user has been involved in. Moreover a place for auction button 1206 is provided that links to an auction page where the user can place his/her portfolio up for auction. Clicking on the transaction history button 1204 links to the transaction history page 1900 in which the user's trading history is shown. As shown in FIG. 19, the transaction history page 1900 has a display area 1912 that lists all the cards the user has purchased or sold and the list of all auction portfolios he/she purchased. Once a portfolio is purchased from a bulk auction, it is merged to a user's portfolio. Once a portfolio is sold through the bulk auction, the account is closed. History detail is selectable from sport pull down menu 1902, Buy/sell pull down menu 1904, Auction pull down menu 1906, and timeframe pull down menu 1908. The display is refreshed by selecting the submit button 1910. History details, such as, e.g., selling date, selling price of the cards sold, buying date, buying price of the cards bought, and the like, are displayed on this page.

Figure 13:
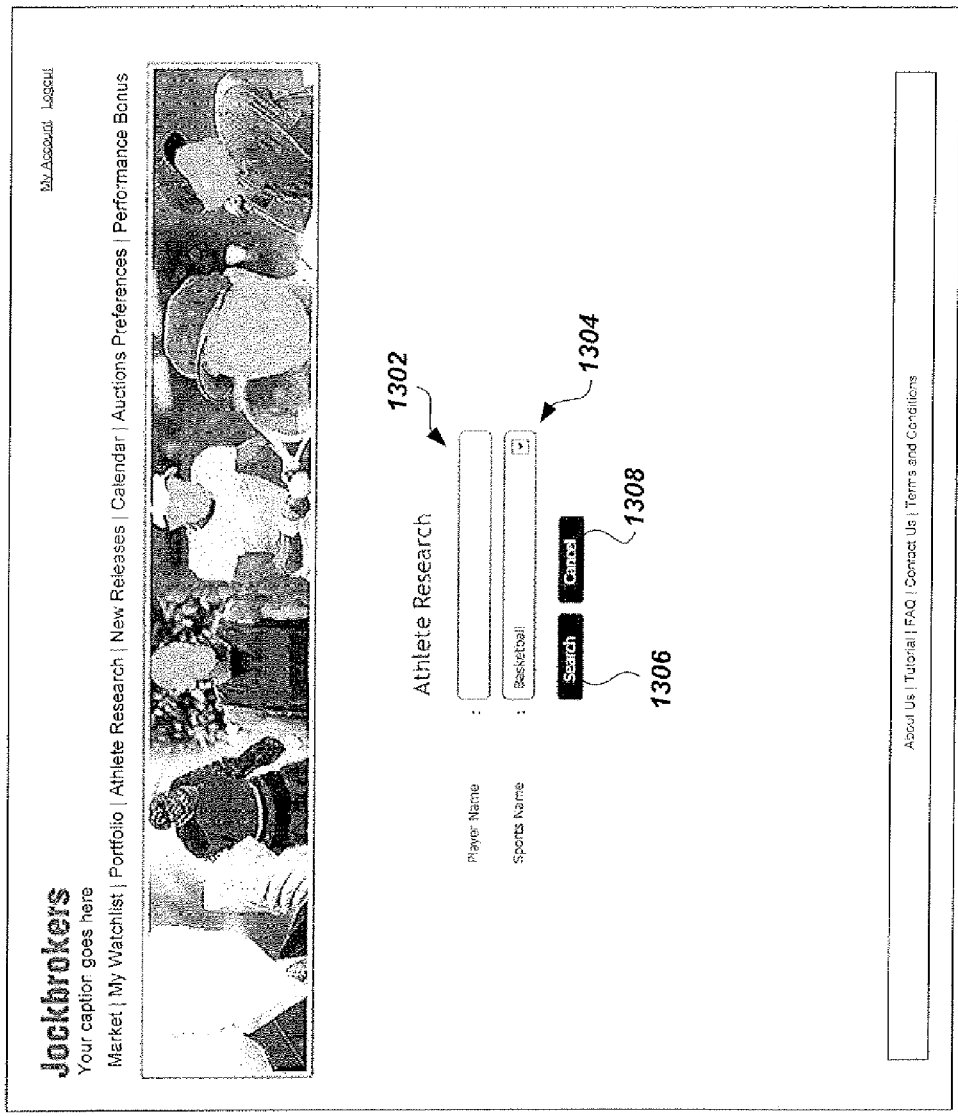
FIG. 13 is a screenshot of an athlete research page of a sports share trading web site according to the present invention.

As shown in FIG. 13, an athlete research page 1300 provides an internal search engine that allows the user to search according to athlete's last name or by ticker symbol by entering all or part of the information into a text box 1302 and clicking the search button 1306. To search by sport, a sport pull down menu 1304 is provided from which the user clicks on one of the sports listed in the pull down menu 1304. Search results will display in the same window and will be ranked by default from highest price to lowest price. Sorting of the athletes can be done by clicking the column headings e.g., Athletes Name, Sport, Buy Amount, and Sell Amount.

The user will be able to click column headings to rank the athletes by other means such as today's volume, increase percentage, age, or by name. Once the display order is established, the user may reverse the order by clicking the heading again. The user can click an athlete's name from the list to be forwarded on to the athlete's page. A search cancel feature is provided by the Cancel button 1308.

Figure 14:
FIG. 14 is a screenshot of a calendar page of a sports share trading web site according to the present invention.

As shown in FIG. 14, a calendar page 1400 is provided. The calendar page shows an image of a calendar 1402 with the dates and times of upcoming events 1406 such as new releases 1404, bulk auctions, press releases, season start dates, and other important dates that might be useful to the users. Calendar page displays the calendar image enlarged and the events of the site, auction portfolios on particular date, and any new release of the athlete cards are displayed in this calendar on the respective date fields with the event title. On click of the respective date, it redirects to the Event Detail Page or Auction page or New Release page respectively. Events detail page displays the event title, event description, and the like, as follows: Title Event Start Date Event End Date Description Event Place.

Figure 15:
FIG. 15 is a screenshot of an auctions page of a sports share trading web site according to the present invention.

As shown in FIG. 15, an auctions page 1500 shows the times and dates of upcoming auctions, as well as their ending dates. Columnar fields in the auction list include lot number 1502, quantity 1504, market value 1506, current bid 1508, ending date 1510, and ending time 1512. Once a portfolio has been reviewed by the market specialist and the auction date has been set by the user, the user may not stop the auction process. Below each date are lot numbers with links to portfolios that will be auctioned on that date. Users can click a lot number to view the cards and quantities in the lot. While on the portfolio page the user can place a bid by entering the maximum the user is willing to pay for the portfolio in the field and clicking the bid button which is located above and beneath the portfolio listing. To be valid, the user's maximum bid must be higher than the current bid. The current bid is increased if the current bidder was not already at his/her maximum bid. If the current bidder is at his/her maximum bid, then the user becomes the high bidder at the next bid increment not at his/her maximum.

The maximum bid is held in reserve unless another user places a bid. If another user outbids the current bid, the process continues until the expiration of the auction. Any bids placed within one minute of the end of the auction will increase the length of the auction slightly so that all bidders have the chance to update his/her bids before closing. A user can return to the auctions page 1500 as often as desired to update his/her maximum bid, but it can never go lower than the current price.

Figure 16:
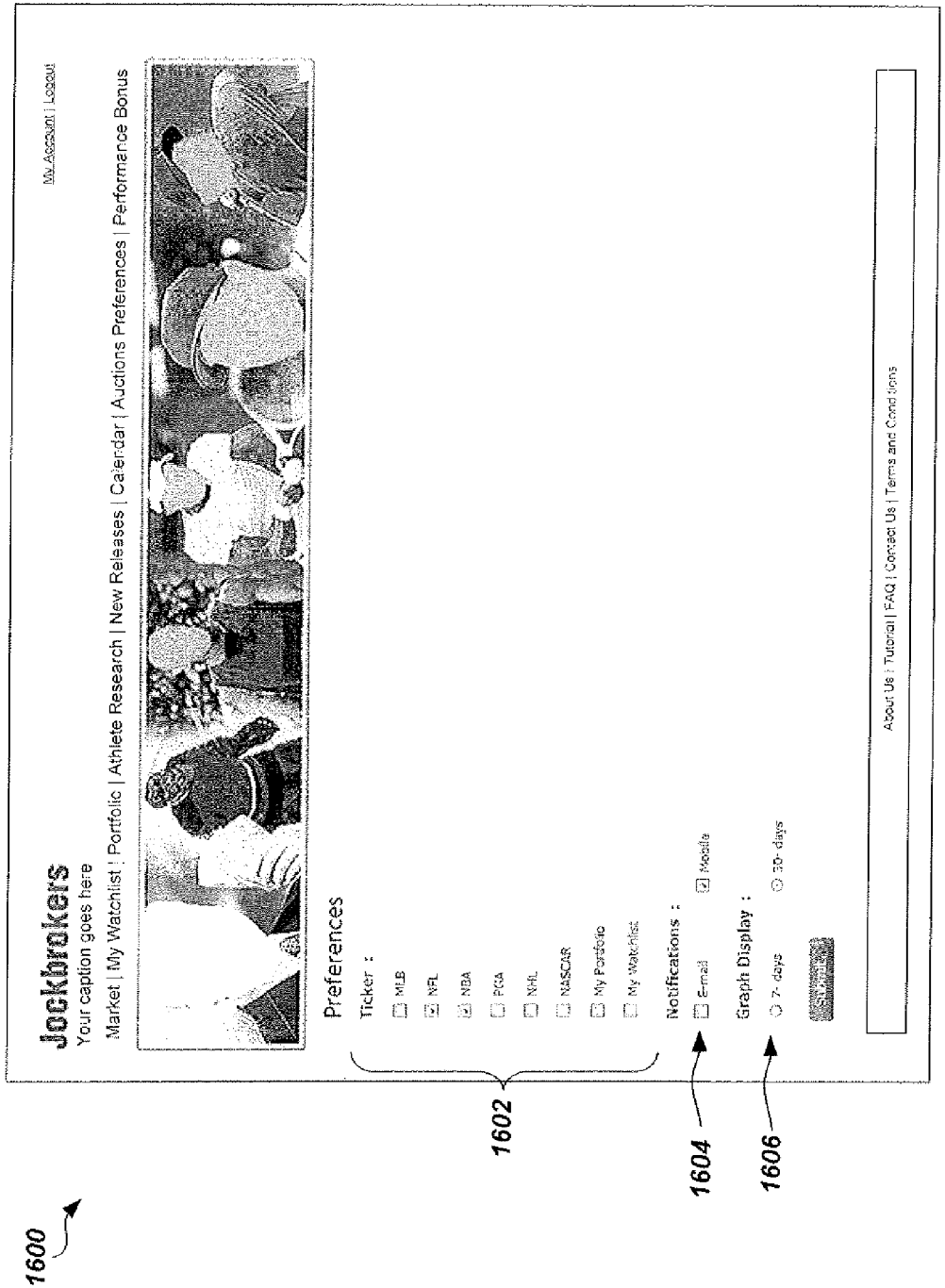
FIG. 16 is a screenshot of a user preferences page of a sports share trading web site according to the present invention.
Figure 17A:
Figure 17B:
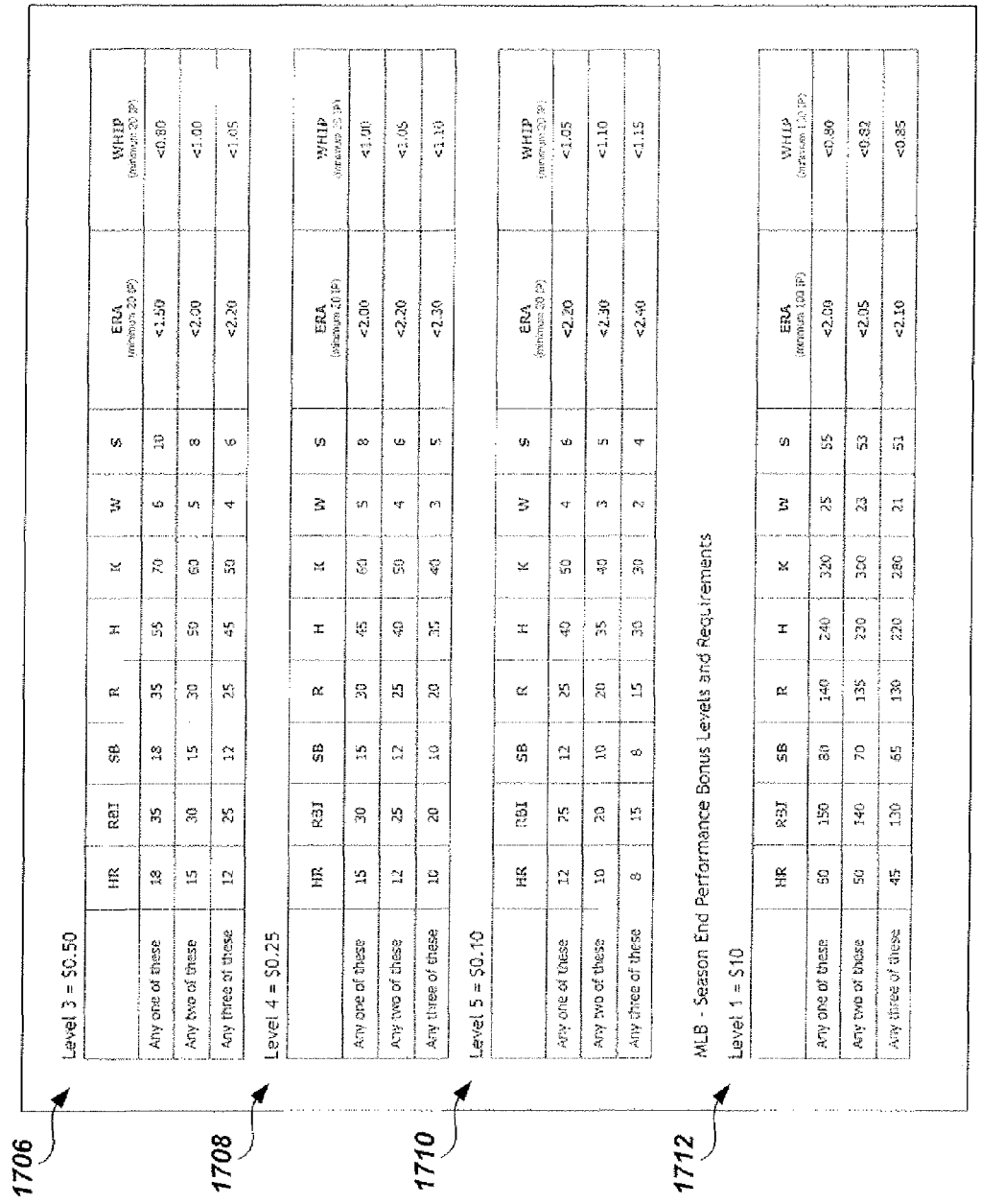
Figure 17C:
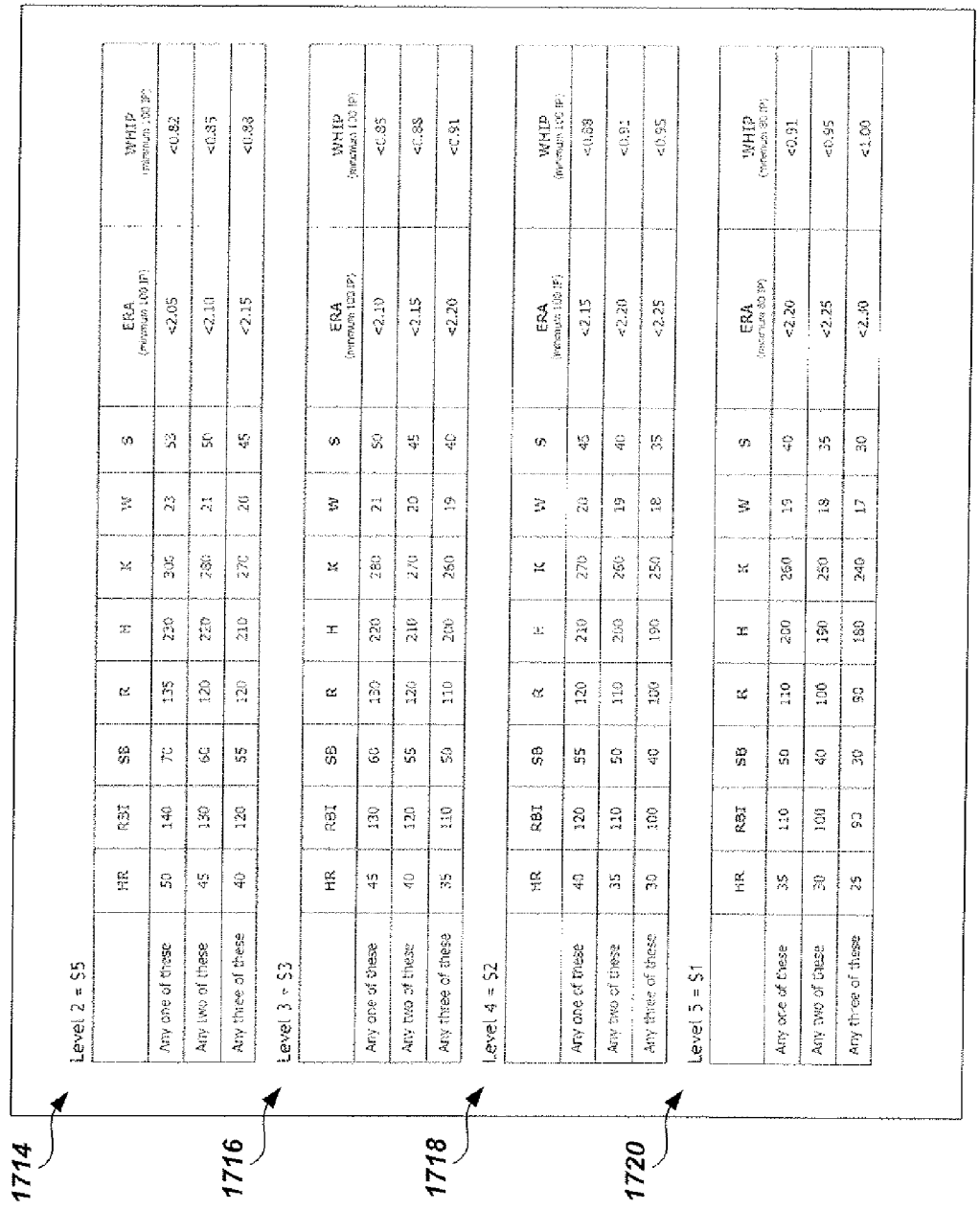
Figure 17E:
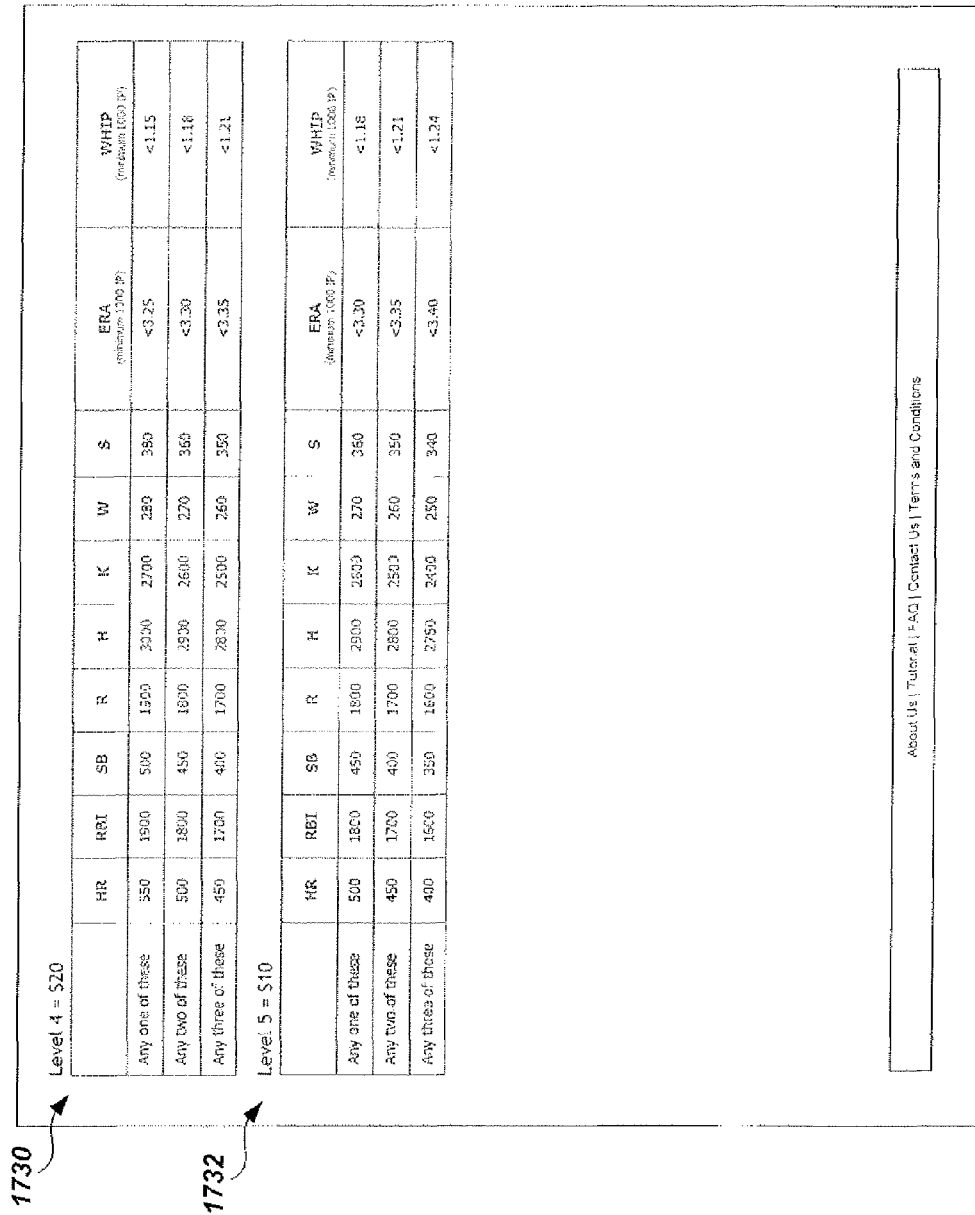

As shown in FIG. 16, a preferences page 1600 has all the customizable options for the user's account. The system 300 provides means for the user to set options for how many recent trades are to be displayed on his/her market page, how the ticker is displayed, e-mail and mobile alerts, and many other standard options. The user will also have the options to name a beneficiary and set the defaults for graph displays on the preferences page. The exemplary preferences page 1600 includes ticker settings 1602, notifications 1604 and graph display options 1606. Clicking the submit button below the graph display options 1606 enables the user selected preferences on the preferences page 1600.

There will be a simple form for registration for users with username, email and password. Once they register they will be able to see the trading pages. If they need to do any trading activities, they need to fill the form with below information and deposit the amount for the activities.

A performance bonus page 1700 is shown in FIG. 17. Performance bonus page 1700 may have a list of sports at the top that are links to sections of the page for each sport. Each sport has performance bonuses for monthly and season-ending awards. Users are paid bonuses if they own cards of athletes at the end of the bonus period. The bonuses are paid per card and there is no limit to the number of bonuses a user might collect over the athlete's career. The bonus system is set up in tiers for all categories. An athlete reaching a higher performance tier sacrifices the bonus for the lower tiers but pays out for the highest level achieved. No performance bonus in a particular category will affect credit to the user of other bonuses based on an athlete's performance in other categories. The monthly and season-ending performance bonuses are set at the beginning of each season for each sport. There are also guaranteed buy-backs for cards of athletes who reach the system designated Hall-Of-Fame "HOF" performance tiers. These performance tiers are set at the time of the release and guaranteed to remain the same for all athletes released in any given year for a given sport. Performance bonuses are similar to dividends on a stock purchase. The user must own the card at the end of the performance bonus period and is awarded the bonus that fits the performance achieved by the athlete. Performance bonuses will be set up for each sport, and they may change from year to year. There will be different tier levels for each bonus. Exemplary performance bonus page 1700 displays the various tier levels and may continue in multiple web pages to display all of the tiers that may be active. For example, page 1700 displays Major League Baseball (MLB) monthly performance bonus levels and requirements in a plurality of levels including level 1 1702, level 2 1704, level 3 1706, level 4 1708, and level 5 1710. The season end performance bonus levels and requirements are displayed in a plurality of levels including level 1 1712, level 2 1714, level 3 1716, level 4 1718, and level 5 1720. And finally, under Hall of Fame buy backs screen area 1722, the Hall of Fame achievement levels are displayed in a plurality of levels including level 1 1724, level 2 1726, level 3 1728, level 4 1730, and level 5 1732.

With respect to retired athletes, users may choose to retain ownership of cards and may trade them in the market. Unlike a performance bonus, there is no defined time or event that ends an athlete's career, other than death. A user can take advantage of the HOF buy back tier as soon as the athlete qualifies, but they must relinquish ownership of the card, and with it, any future bonuses that may be earned. The system has no rule restricting trading of retired athletes. At their retirement, they become eligible for HOF buy backs and they would obviously not be able to compete for performance bonuses, but a user is not forced to take delivery or cash them in for a current HOF tier level. Users can receive a buy back amount, which would mean the Admin will pay user the amount that coincides with the chart for the year the athlete was released and the career performance tier the athlete achieved, while the user would relinquish ownership of the card, and with it, any future bonuses that may be earned. The user may also request to take possession of the cards of retired athletes or any other athletes in their current portfolio at any time. Once this request has been made from this closed market, the user can no longer sell these particular cards in the market, and they are no longer eligible for future performance bonuses or HOF buy backs. Once cards are removed from the market, the total quantity or "supply" is reduced, and the cards cannot be re-entered into the market.

A tutorial page has the option of text or detailed video demonstrations regarding the use of every section of the site.

A frequently asked questions page will show a list of the most popular questions and the answer to them. Some of the more complicated responses have detailed video demonstrations to accompany them.

A contact us page has contact information for user service by phone, email, real time chat, and displays user service hours of operation.

Figure 18A:
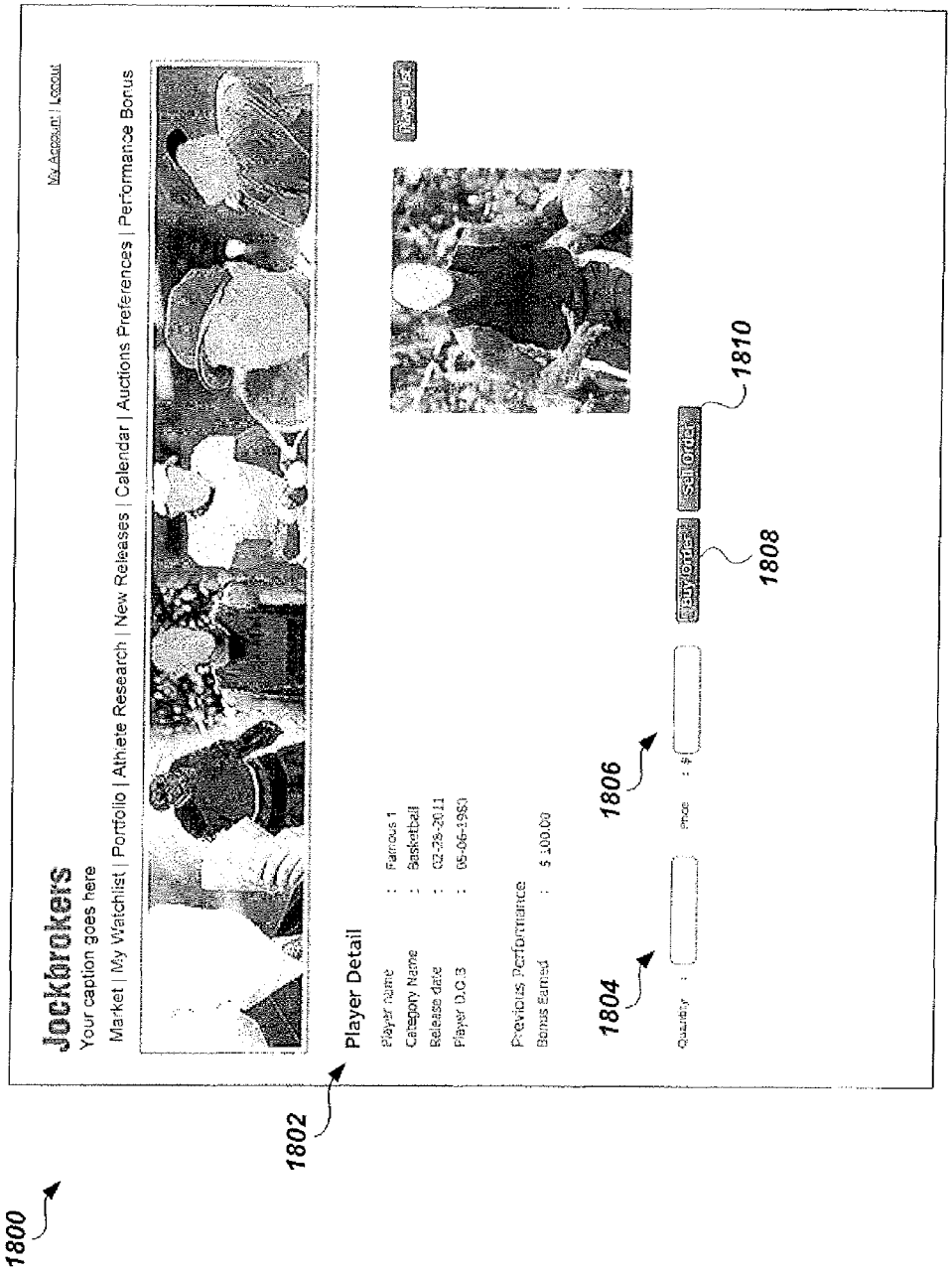
FIGS. 18A and 18B are screenshots of an athlete detail page of a sports share trading web site according to the present invention.
Figure 18B:
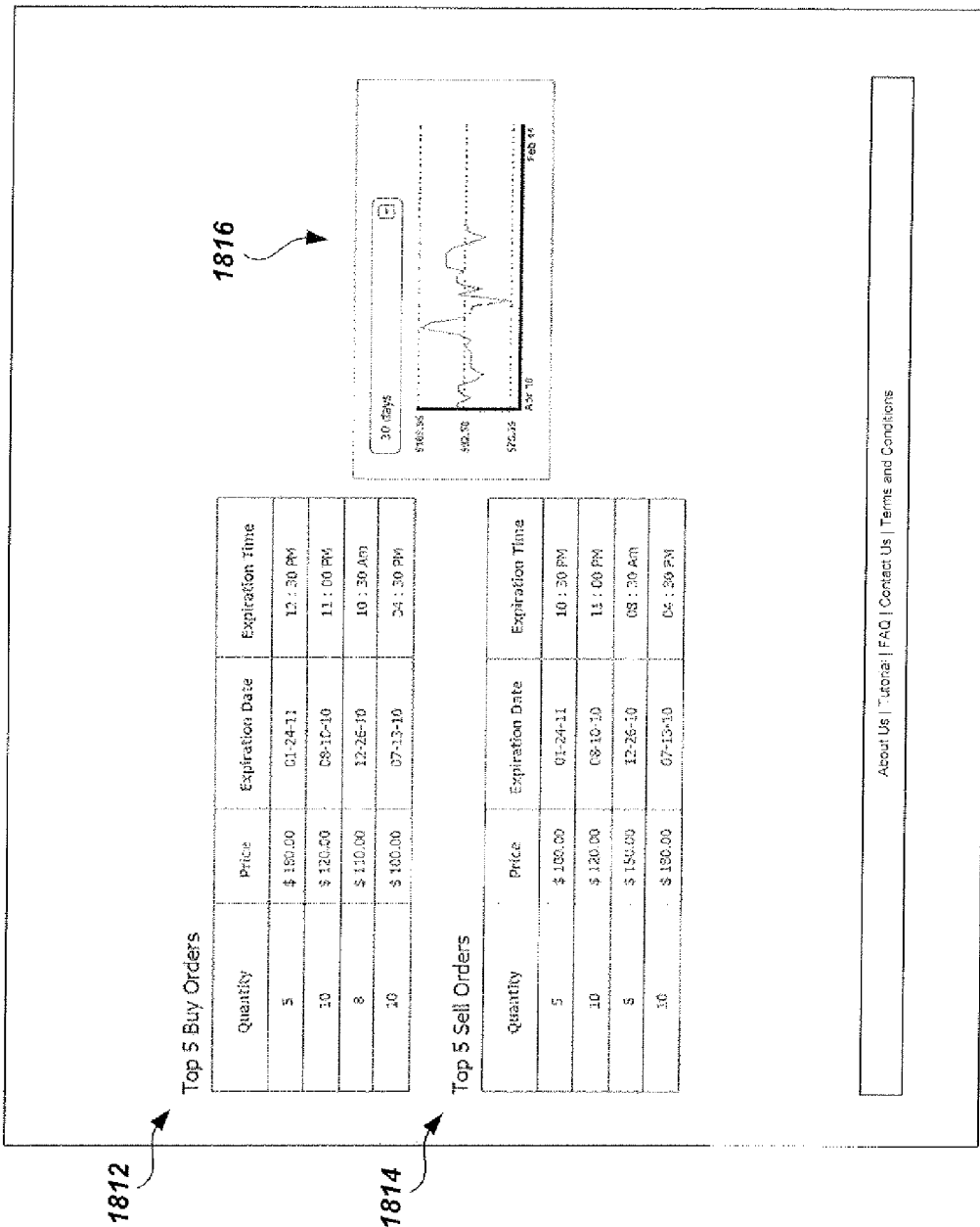

Each athlete has an athlete detail page 1800 (shown in FIG. 18) that displays a picture of the card that is being traded in the market and a detailed description area 1802 that includes the athlete name, card number, year of issue, brand of card, release date, athlete D.O.B., previous performance bonuses earned, and quantity in the market. Displayed below the picture and description are two buttons. The page has a buy order button 1808 and a sell order button 1810, and just beneath the order buttons is a listing of top five buy orders 1812 and top five sell orders 1814. A quantity entry field 1804 and a price entry field 1806 are provided to accept user entry of a desired quantity and a desired price. A price chart 1816 displays historical price data over a user selectable time frame.

To place an order, the user clicks either the place buy order or place sell order button. Once the appropriate button is clicked a mini popup window opens. In this window, the user has the option to enter a number of cards for purchase or sale and the desired transaction price. If the amount the user enters is already available in the market, then the order will be filled immediately and the funds and cards will be transferred appropriately between the buyer and seller, less the commission paid to the company. For example, if a person puts up a SELL for 100 cards at $5.00 and there is a buy order already posted for 20@ $5.10 and 80@ $5.00 the system should auto-fill the order paying the seller 20@ $5.10 ($102) and 80@ $5.00 ($400), total $502, not $500 for the 100@ $5.00 as he posted. This should split if he posts 100@ $5.00 and there is a buy order for 80@ $5.00 where 80 are autofill and 20 are posted as a sell order @ $5.00. The system provides a warning if he tries to sell too low. An exemplary case is where there are BUYs posted of 20@ $5.10 and 80@ $5.00 and the user tries to sell 1000 at $1.00. The system 300 warns the user that the top buy price is $5.00 and subsequently confirms the action at $1.00 to proceed. Even if he confirms this, the sale should goes through at the top prices until the order is complete. Moreover, the system 300 provides a check to verify that the user has the cards in his portfolio. Otherwise, it will be in pending list until any user buys the order at the same price that the seller is planning to sell. The present method also contemplates the possibility of short selling.

Exemplary buy order processing includes the user entering the required values, after which the request will be processed only if the amount in his account is more than the price he entered. Otherwise, the user will get the alert message saying, "Your account balance is low. To complete this transaction, user needs to deposit _____". After submitting these details, if the user-entered price is equal to the last sell price that seller entered, then the order gets filled and the funds are transferred appropriately. If the price is below market price, the order is placed in the Pending requests order by the best price.

If the amount is not currently available in the market, the quantity and price will be listed in rank order by best price with all of the other pending buy or sell orders. In an example buy order, assuming that user_2 gives the values as follows: number of cards=5, price=$4.50. In this instance, the scenario is the price entered by the user_2 doesn't match with trading. So, the transactions don't take place. Instead, the user_2's quantity and price details will be listed in the Pending requests order by the best price.

Proximate the top 10 list the history graph 1816 shows the price fluctuations over the last 30 days by default but the user is able to select 7 days, 90 days, 180 days or 365 days as well.

Administrator (Admin) is the user who manages all the functionalities from the backend. Super Admin can create roles and can assign permissions to the roles. He can assign users to a particular role, and that user can manage the Admin functionalities that are assigned to that particular role. Administrator can manage all the users profile management easily. Administrator has the complete control over the web site and can administer the web site directly at server 305 or, alternatively, from an administrator user's terminal 325. A real time chat facility with the site users is also provided. Furthermore, it is contemplated that the system 300 can integrate third party online chat applications.

Admin can view all the details of the users who registered into the site. Admin can also activate and deactivate the user profile. Once the user is deactivated from the site, he will be receiving the mail to his personal mail id and will not be able to login in to the site.

Admin can view the payments or the deposited amount by the user at the time of registration. Admin can update the credits of the particular user based on his amount deposited. Or, he can manage or update the user credits in a circumstance that this becomes necessary.

Admin has the right to create the sports categories. There will be view, edit and delete options for these categories, so that he can edit and delete the categories. The fields for the categories will be only—Category Name.

The Admin can add the athletes (athletes) to the site. He can also edit and delete the athlete details from the athletes list. While adding the new athlete to the site, Admin needs to give the following details of the Athlete: 1. Athlete Name; 2. Sport Category; 3. Card Image; 4. Card Number; 5, Year of issue; 6. Brand of Card; 7. Release Date; 8. DOB; 9. Quantity; and 10. Previous Performance Bonus.

The New Release is a BLIND BID Auction where users have a deadline to place a bid for quantity and price they are willing to pay. The Admin. will see a ranked list of these bids but once placed the user will only have an emailed report for the quantity and price he offered until the auction is over, at which time the transactions are made automatically by the system to those who were the highest bidders until all of the cards available are gone.

Admin manages the bonuses earned by the athletes to the users. Admin can add the bonus on particular athletes. The form for adding the bonus on the particular card or athlete includes: (1) Athlete Name or Card Title, (2) Bonus Offer. The Bonus Offer provides the ability to distribute a bonus to a particular athlete. The system 300 calculates the amount for each user based on the number of cards of that athlete that the user has in his portfolio at the end of the bonus period. There will be a message to accompany the bonus saying "you were credited $XX.XX as a result of Athlete XXX's Tier #1 performance bonus for XXXX period.

Admin manages the details of the New Release and the bidding details made by the users. Admin can view all the bidding values on a particular athlete card made by all the users.

Admin also manages all of the buy and sell processes of the users. Admin can view the details of the users who Place the orders for buying and selling the cards and the price details etc. Here, Admin can freeze trading for some reason, if necessary. In general the system should handle all buy/sell processes.

The Admin can manage pages, such as, e.g., "About us", "tutorial", "FAQ", "Contact us", "Terms & Conditions". Moreover, the Admin can manage the events and occasions via add, edit, or delete of the events.

The Admin is provided the capability to manage the portfolios for the auction system. By reviewing the portfolio details and the basic price the user auctioned, Admin can make the decision to offer the auction or not. If the Admin guarantees the offer, he sends the email to the user mentioning the offer is guaranteed.

The system 300 can list out registered users who have not paid the deposit amount to become a trader. The system 300 sends such users reminders/newsletters, reminding them of the advantages of being a paying member.

Admin can manage the market specialist. Admin can create any number of market specialists who can access the trading system in the site. Admin can manage (add or subtract) each market specialist's account and view the details of all the cards that he holds.

The Admin can send internal mails to users regarding the new athlete details, bonus details, bid winning details etc. End users have the option to read the messages and reply to Admin. The Admin has the option to manage the advertisements that are displayed to the end user.

After a Web site user has funded his/her account, the user starts searching for his/her favorite sport or athlete. Users can add cards to their portfolio by the following methods. (1) Blind bidding on a New Release—The user would place a bid and quantity for a new athlete card being introduced into the market. The bids are ranked and orders are filled until the entire supply is depleted. (2) Purchase in the market—Just like buying shares of a company on the NYSE there will be posted buy and sell orders placed by other users. A new user finds the athlete they want and places a buy order for the associated athlete card. If that order is equal to a current sell order the transaction is made immediately. If not, the buy order is posted for other users to match with his/her sell orders. (3) Purchase a bulk portfolio—A new user might want to start off with a big splash by bidding in a bulk portfolio auction offered by the system 300. These are whole portfolios of users who wish to liquidate their entire stock and take home the cash rather than taking delivery of the cards.

The web site offers this to all users as a method for ensuring that his/her assets are liquid at all times, and the system contemplates that the vast majority of exiting users will take advantage of this feature. Once a user has purchased cards, they are placed in his/her portfolio. The user then can sell the cards in the market; take delivery of his/her cards, or hold on to them to possibly receive many different performance bonuses in the form of credits for upcoming New Releases. The user may also hold the card in his/her portfolio until the athlete's retirement, at which time the card may be eligible for a guaranteed Hall-of-Fame buy-back.

After the release date of any athlete card the system 300 limits athlete card acquisition to methods #2 or #3. At some point, a user might want to liquidate his/her entire portfolio to inspire additional confidence in the market and the liquidity of the user's holdings. The web site will offer to buy back entire portfolios at any point in the future. Users have the option to submit his/her account for an offer from the system's Market Specialist, who will appraise the value of the portfolio and make the offer to the user. Assuming that the user is happy with the offer or feels that the offer will suffice as a starting point, the portfolio is placed for auction, with the starting bid being the guaranteed offer from the Market Specialist of the system. The auction runs until a predetermined date and time, with extensions added for late bids to ensure that the user is getting the best possible price.

Sports cards have an inherent value, especially the rookie issue, but to drive demand and help to create more market fluctuations, the system 300 offers many levels of performance credits for owners of athlete cards benefiting from particular pre-set performance goals met by the underlying athlete. In this example, the card depicts and describes a golfer called "Famous 3" who currently plays professional golf in a variety of tournaments. Although the athlete is fictitious, the actual trading cards used in practice of the invention will depict real athletes actively engaged in a real sport, such as baseball, football, basketball, hockey, golf, etc., for which athlete's statistics are known. As is conventional for a sports trading card, the picture of the "talent" is depicted on the front of the card and the current statistics (at the time the trading card is produced) concerning the talent are set forth on the back. For instance, if a user owns Famous 3 and Famous 3 wins The Masters, then the system 300 distributes to the user a top-tier level of The web site Credits to be used on future New Releases. Famous 3 might also place $5^{th}$ in The Masters and in the top 10 the following week, earning a tier 7 performance credit that is used for upcoming New Releases. These performance credits are earned as of the end of a performance period and distributed to the cardholder similar to a dividend distribution. The performance periods will be monthly and season ending.

The system allows for a guarantee of the value of the cards being traded in an applicable market based on the performance of the athlete the cards represent, as well as offering other performance based incentives throughout the career of the athlete.

The system's portfolio auctions allow users to quickly liquidate their holdings. The system's guaranteed Hall-of-Fame buy-backs allow an investor to know that if his/her portfolio performs well over the athletes' careers, that for each athlete card, the user has a guaranteed set price upon the underlying athlete's retirement.

The system uses only the rookie card of the athlete to represent them in the market. These cards will be of a specific brand and a specific card of that brand but the brand of card may be different from year to year and may vary from sport to sport. For example, in 2012 the system might release Famous 9 into the market using his 2001 Upper Deck #295 card. In 2013 the system could release Famous 30's Topps #88 card. The system permits only one version of the card in the market representing that athlete, which is set upon his release date. The cards representing the athletes in the system's closed market will be graded "pristine" and will be sealed in hard, clear polypropylene containers with a Web site logo. For every trade made in the system's market, the system will collect a trade commission.

The system 300 contemplates affiliates in which an affiliate can earn between $20 and $50 for each user who signs up and makes an initial deposit, and the users the affiliate signs up will also receive deposit bonuses. This method turns marketing expenditure into a variable cost and allows payment for it after user money is in hand.

Unless specifically stated otherwise, as apparent from the above discussion, it is appreciated that throughout the description, discussions utilizing terms such as "processing" or "computing" or "calculating" or "determining" or "displaying" or "providing" or other present participle descriptive, refer to the action and processes of a computer system, or similar electronic computing device, that manipulates and transforms data represented as physical (electronic) quantities within the computer system memories or registers or other such information storage, transmission or display devices.

Certain aspects of the present method include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of non-transitory media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems along with equivalent variations will be apparent to skilled artisans. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to similar and/or dissimilar computers and storage devices over a network, such as the Internet.

It is to be understood that the present invention is not limited to the embodiments described above, but encompasses any and all embodiments within the scope of the following claims.

I claim:

1. A computer software product that includes a non-transitory storage medium readable by a processor, the non-transitory storage medium having stored thereon a set of instructions for performing sports share trading, the set of instructions comprising:
   (a) a first set of instructions which, when loaded into main memory and executed by the processor, causes the processor to provide a web site accessible to users via the Internet;
   (b) a second set of instructions which, when loaded into main memory and executed by the processor, causes the processor to display on the web site indicia of athletes for trading in a closed market;
   (c) a third set of instructions which, when loaded into main memory and executed by the processor, causes the processor to publish on said web site tiers of performance levels of the athletes;
   (d) a fourth set of instructions which, when loaded into main memory and executed by the processor, causes the processor to assign a predetermined number of shares in each of the athletes, thereby introducing scarcity in the closed market, the shares representing virtual stakes in the careers of the athletes;
   (e) a fifth set of instructions which, when loaded into main memory and executed by the processor, causes the processor to accept the users' selections from among the indicia to formulate trade orders of up to the predetermined number of shares in the athletes;
   (f) a sixth set of instructions which, when loaded into main memory and executed by the processor, causes the processor to assign on a one-to-one basis an asset token for each of the shares;
   (g) a seventh set of instructions which, when loaded into main memory and executed by the processor, causes the processor to formulate the trade orders of the shares in the athletes;
   (h) an eighth set of instructions which, when loaded into main memory and executed by the processor, causes the processor to post the trade orders on the web site;
   (i) a ninth set of instructions which, when loaded into main memory and executed by the processor, causes the processor to execute the trade orders on behalf of the users when at least one purchase-side bid price of the trade orders matches at least one sell-side ask price of the trade orders, the prices being determined by scarcity of the shares in combination with buy-sell pressure caused by the users; and
   (j) a tenth set of instructions which, when loaded into main memory and executed by the processor, causes the processor to maintain detailed accounting records including the asset tokens, the users, and the trade orders, accounts of the users being settled with real money.

2. The computer software product according to claim 1, wherein said asset token is represented by a sports card associated with a particular one of the athletes.

3. The computer software product according to claim 2, wherein said sports card is a rookie card.

4. The computer software product according to claim 2, wherein said sports card is a scanned image of a physical sports card, the scanned image being displayed on said web site.

5. The computer software product according to claim 1, further comprising an eleventh set of instructions which, when loaded into main memory and executed by the processor, causes the processor to generate offers to the users on the web site to buy back user-owned asset tokens, buy back prices being based on the career performance levels of the athletes.

6. The computer software product according to claim 5, further comprising a twelfth set of instructions which, when loaded into main memory and executed by the processor, causes the processor to provide a tier corresponding to a Hall of Frame performance level of the athletes.

7. The computer software product according to claim 5, further comprising:
   a thirteenth set of instructions which, when loaded into main memory and executed by the processor, causes the processor to accept user owned portfolios of said asset tokens for auction to remaining users of the web site on the web site;
   a fourteenth set of instructions which, when loaded into main memory and executed by the processor, causes the processor to perform the auction on the web site according to a predetermined set of auction rules;
   a fifteenth set of instructions which, when loaded into main memory and executed by the processor, causes the processor to take a percentage of proceeds of the auction; and
   a sixteenth set of instructions which, when loaded into main memory and executed by the processor, causes the processor to credit remaining proceeds to the users formerly owning the portfolios sold at the auction.

8. The computer software product according to claim 7, further comprising a seventeenth set of instructions which, when loaded into main memory and executed by the processor, causes the processor to conduct a blind bid New Release auction of sports card being introduced in the market to the users of said web site on the web site.

9. The computer software product according to claim 8, further comprising:
   an eighteenth set of instructions which, when loaded into main memory and executed by the processor, causes the processor to award performance bonuses to users holding asset tokens, wherein the performance bonuses are based on the athlete's achievement of a predetermined performance tier level in a predetermined period of time.

10. A sports share trading system, comprising:
    means for providing a web site accessible to users via the Internet;
    means for displaying on the web site indicia of athletes for trading in a closed market;
    means for publishing on said web site tiers of performance levels of the athletes;
    means for assigning a predetermined number of shares in each of the athletes thereby introducing scarcity in the closed market, the shares representing virtual stakes in the careers of the athletes;
    means for accepting the users' selections from among the indicia to formulate trade orders of up to the predetermined number of shares in the athletes;
    means for assigning on a one-to-one basis an asset token for each of the shares;
    means for formulating the trade orders of the shares in the athletes;
    means for posting the trade orders on the web site;
    means for executing the trade orders on behalf of the users when at least one purchase-side bid price of the trade orders matches at least one sell-side ask price of the trade orders, the prices being determined by scarcity of the shares in combination with buy-sell pressure caused by the users; and means for maintaining detailed accounting records including the asset tokens, the users, and the trade orders, accounts of the users being settled with real money.

11. The sports share trading system according to claim 10, further comprising means for representing said asset token by a sports card associated with a particular one of said athletes.

12. The sports share trading system according to claim 11, wherein said sports card is a rookie card.

13. The sports share trading system according to claim 12, wherein said sports card is a scanned image of a physical said sports card, the scanned image being displayed on the web site.

14. The sports share trading system according to claim 10, further comprising means for causing said web site to make offers to the users to buy back user-owned asset tokens, buy back prices being based on the career performance levels of the athletes.

15. The sports share trading system according to claim 14, further comprising means for providing a tier corresponding to a Hall of Frame performance level of the athletes.

16. The sports share trading system according to claim 14, further comprising:

means for accepting user-owned portfolios of said asset tokens for auction to remaining users of said web site;

means for performing the auction on the web site according to a predetermined set of auction rules;

means for taking a percentage of proceeds of the auction; and means for crediting remaining of the proceeds to the users formerly owning the portfolios sold at the auction.

17. The sports share trading system according to claim 16, further comprising means for conducting a blind bid New Release auction of sports card being introduced in the market to the users of said web site.

18. The sports share trading system according to claim 17, further comprising:

means for awarding monthly and season-ending performance bonuses associated with each of the athletes; and means for crediting the performance bonuses to the user accounts having portfolios earning the performance bonuses.

19. A computer software product that includes a non-transitory storage medium readable by a processor, the non-transitory storage medium having stored thereon a set of instructions for performing sports share trading, the set of instructions comprising:

(a) a first set of instructions which, when loaded into main memory and executed by the processor, causes the processor to provide a web site accessible to users via the Internet;

(b) a second set of instructions which, when loaded into main memory and executed by the processor, causes the processor to display on the web site indicia of athletes for trading in a closed market;

(c) a fourth set of instructions which, when loaded into main memory and executed by the processor, causes the processor to assign a predetermined number of shares in each of the athletes, thereby introducing scarcity in the closed market, the shares representing virtual stakes in the real time careers of the athletes;

(d) a fifth set of instructions which, when loaded into main memory and executed by the processor, causes the processor to accept the users' selections from among the indicia to formulate trade orders of up to the predetermined number of shares in the athletes;

(e) a sixth set of instructions which, when loaded into main memory and executed by the processor, causes the processor to assign on a one-to-one basis an asset token for each of the shares, wherein the asset token is represented by a unique sports card associated with a particular one of the athletes;

(f) a seventh set of instructions which, when loaded into main memory and executed by the processor, causes the processor to formulate the trade orders of the shares in the athletes;

(g) an eighth set of instructions which, when loaded into main memory and executed by the processor, causes the processor to post the trade orders on the web site;

(h) a ninth set of instructions which, when loaded into main memory and executed by the processor, causes the processor to execute the trade orders on behalf of the users when at least one purchase-side bid price of the trade orders matches at least one sell-side ask price of the trade orders, the prices being determined by a plurality of factors, including scarcity of the shares in combination with buy-sell pressure caused by the users and real time performance compared to the tier of performance levels of the athlete; and (i) a tenth set of instructions which, when loaded into main memory and executed by the processor, causes the processor to maintain detailed accounting records including the asset tokens, the users, and the trade orders, accounts of the users being settled with real money.

* * * * *